United States Patent
Ishida et al.

(10) Patent No.: US 7,259,878 B2
(45) Date of Patent: Aug. 21, 2007

(54) IMAGE PROCESSING APPARATUS EFFECTIVE FOR PREVENTING COUNTERFEITING OF A COPY-PROHIBITION OBJECT

(75) Inventors: Yoshihiro Ishida, Kanagawa (JP); Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 09/769,363

(22) Filed: Jan. 26, 2001

(65) Prior Publication Data

US 2001/0017717 A1  Aug. 30, 2001

(30) Foreign Application Priority Data

Jan. 31, 2000 (JP) ............................. 2000-021566

(51) Int. Cl.
*G06F 15/00* (2006.01)
*G06K 1/00* (2006.01)

(52) U.S. Cl. .................. 358/1.14; 358/1.16; 382/135; 382/191

(58) Field of Classification Search ...... 358/1.11–1.18, 358/1.1, 1.9; 382/135, 191, 227; 399/39; 705/57
See application file for complete search history.

(56) References Cited

U.S. PATENT DOCUMENTS

| | | | |
|---|---|---|---|
| 5,465,172 A * | 11/1995 | Fukushima et al. ......... 358/498 |
| 5,561,534 A | 10/1996 | Ishida et al. |
| 5,600,720 A | 2/1997 | Iwamura et al. |
| 5,621,810 A * | 4/1997 | Suzuki et al. ................ 382/135 |
| 5,666,419 A | 9/1997 | Yamamoto et al. |
| 5,694,486 A | 12/1997 | Shigeeda et al. |
| 5,719,968 A * | 2/1998 | Hashimoto et al. ......... 382/288 |
| 5,748,777 A | 5/1998 | Katayama et al. |
| 5,757,961 A | 5/1998 | Yamakawa et al. |
| 5,809,366 A * | 9/1998 | Yamakawa et al. ........... 399/39 |
| 5,828,794 A | 10/1998 | Katayama et al. |
| 5,933,528 A | 8/1999 | Katayama et al. |
| 5,937,395 A | 8/1999 | Iwamura |
| 6,088,454 A | 7/2000 | Nagashima et al. |
| 6,111,994 A | 8/2000 | Katayama et al. |
| 6,643,028 B1 * | 11/2003 | Ogaki et al. ................ 358/1.6 |

FOREIGN PATENT DOCUMENTS

JP          10-327323        12/1998

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto

(57) ABSTRACT

When determining whether or not an image of an original input from an image reading device is a copy-prohibition image, a mounting position, a mounting angle or the like of the original is detected, and it is determined whether or not exact determination can be performed. If an exact determination cannot be performed, a signal instructing to again read an image of the original is output, and the operator is provided with a warning.

17 Claims, 11 Drawing Sheets

IMAGE PROCESSING APPARATUS EFFECTIVE FOR PREVENTING COUNTERFEITING OF A COPY-PROHIBITION OBJECT

BACKGROUND OF THE INVENTION

1. Field of the Invention

The present invention relates to an image processing apparatus suitable for preventing counterfeiting of copy-prohibited objects, such as paper money, securities and the like.

2. Description of the Related Art

Recently, it has been proposed to mount in a color copier an image recognition processing function or the like for preventing counterfeiting of paper money, securities and the like. That is, when image data to be copied is determined to represent an image for which counterfeiting is to be prevented, normal copy output of the image is prevented, for example, by (1) providing print output by painting the entire image with a certain color, (2) providing print output by superposing a certain symbol or figure on the image, (3) providing print output by changing the color or the image size, or (4) providing no print output.

A copier is basically designed to faithfully copy an object mounted on an original-mount, except for a copy-prohibited object, such as paper money or the like. Accordingly, if an image which resembles paper money (an image other than paper money which can be legally copied) is input, the copier must recognize that the image is not paper money, and perform a copying operation of the original image. Hence, very precise recognition accuracy is requested for determining whether or not an image to be recognized is an image for which counterfeiting is to be prevented.

Recently, the quality of an image obtained by a color scanner or a color printer, which is less expensive than a color copier, is greatly improved, and it becomes possible to perform a counterfeiting operation by connecting such an apparatus to a personal computer, i.e., by combining apparatuses other than a color copier. Accordingly, even in an image processing system using an inexpensive color scanner or color printer, countermeasures for preventing counterfeiting of paper money, securities and the like by mounting an image recognition function or the like have been desired.

Various methods for determining whether or not an original is a copy-prohibited object have been proposed. In one method, a color spectrum distribution of image data obtained by scanning an original is compared with data registered in advance in a ROM (read-only memory), based on each pixel value (a set of R, G and B values corresponding to three color signals) in the image data (for example, by obtaining a sum of the absolute values of difference values between respective pixel values and stored data, or calculating a cross-correlation value between distributions). In another method, an evaluation value is calculated by comparing a synthetic image pattern of a part or the entirety of an original with pattern data registered in advance in a ROM or the like.

Recently, it became possible to incorporate information indicating a copy-prohibited object within an original, serving as a printed matter, using a technique called "digital watermark That is, when printing an original, serving as a copy-prohibited object, a printed matter is obtained from image data (electronic image information) including copy-prohibited-object information generated by embedding second digital information (sub-information) indicating a copy-prohibited object in image data (electronic image information), serving as original first digital information (main information). This copy-prohibited-object information (sub-information) can be extracted from the image data including the copy-prohibited-object information before printing the original. Furthermore, if consistency between conditions when forming the printed matter from the image data (electronic image information) including the copy-prohibited-object information and conditions in reading and extraction processing is obtained, it is also possible to extract the copy-prohibited-object information from electronic image data obtained by reading the printed matter formed from electronic image information including the copy-prohibited-object information by an original-reading device, such as a color scanner or the like. In consideration of these features, application of the technique called "digital watermark" to prevent illegal copying of an original, serving as a printed matter, has been attracting notice.

However, as described above, in order to extract digital-watermark data embedded using the digital watermark technique, it is necessary to obtain consistency between conditions in reading and extraction and how watermark information is embedded in original-image data (i.e., at what position and with what arrangement in the original-image data the watermark information is embedded).

Accordingly, when reading a printed matter (an original), formed from electronic image information having embedded digital-watermark information, by an original-reading device, such as a color scanner or the like, the direction the original is mounted on the surface of an original-mount greatly influences the difficulty in extraction of digital-watermark information.

When recognizing a copy-prohibited object by comparing a color spectrum distribution of image data obtained by scanning an original with data registered in advance in a ROM, or by calculating an evaluation value by comparing a synthetic image pattern of a part or the entirety of the original with pattern data registered in advance in a ROM or the like, if the direction (angle) or the position of the mounted original is not fixed, the total amount of calculation operations for comparison with spectrum data registered in advance or image-pattern data tends to greatly increase in order to deal with various directions and positions.

In an inexpensive color scanner or color printer, it is desirable to prevent counterfeiting of a copy-prohibited object with a cost lower than in the case of using a relatively expensive color copier. For that purpose, it is preferable to recognize a copy-prohibited object by mainly using software instead of mainly using hardware having a large amount of electronic circuits and the like.

On the other hand, when determining a copy-prohibited image requiring precise recognition accuracy mainly by software, the total amount of calculation operations is large, and the processing time required for the recognition and determination tends to be greatly increased.

That is, if the amount of calculation operations for the recognition and determination is reduced, it generally tends to be difficult to determine a copy-prohibited image requiring precise recognition accuracy such that, for example, it becomes difficult to detect a copy-prohibited object, such as paper money or the like, read by intentionally changing reading conditions (such as a mounting angle or a mounting position of an original on a reading surface), or that when an image resembling paper money (an image other than paper money which is legally allowed to be copied) is input, the image is erroneously recognized as a copy-prohibited image and normal image output is not performed, thereby impairing the original function of an image processing system.

SUMMARY OF THE INVENTION

It is an object of the present invention to provide an image processing apparatus and a method for controlling the same in which the above-described problems are removed.

It is another object of the present invention to provide an image processing apparatus and a method for controlling the same which allow recognition of whether or not an image is a copy-prohibited object that is more precise than in the prior art, even in recognition/determination processing having a relatively small amount of calculation operations in a personal computer system using an inexpensive image scanner or color printer.

According to one aspect, the present invention which achieves these objectives relates to an image processing apparatus including image-data input means for inputting image data, specific-image determination means for determining whether or not the image data obtained by the image-data input means represents a specific image having predetermined characteristics, re-input determination means for determining whether or not a signal urging re-input of the image data obtained from the image-data input means is to be output, and signal output means for outputting the signal urging re-input of the image data, in accordance with a result of the determination by the re-input determination means.

According to another aspect, the present invention which achieves these objectives relates to a method for controlling an image processing apparatus. The method includes the steps of inputting image data, determining whether or not the image data obtained in the image-data input step represents a specific image having predetermined characteristics, determining whether or not a signal urging re-input of the image data obtained in the image-data input step is to be output, and outputting the signal urging re-input of the image data, in accordance with a result of the determination in the re-input determination step.

According to still another aspect, the present invention which achieves these objectives relates to a storage medium, capable of being read by a computer, storing a program to cause an image processing apparatus to execute the following steps. The program includes the steps of inputting image data, determining whether or not the image data obtained in the image-data input step represents a specific image having predetermined characteristics, determining whether or not a signal urging re-input of the image data obtained in the image-data input step is to be output, and outputting the signal urging re-input of the image data, in accordance with a result of the determination in the re-input determination step.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail with reference to the drawings.

Figure 1:
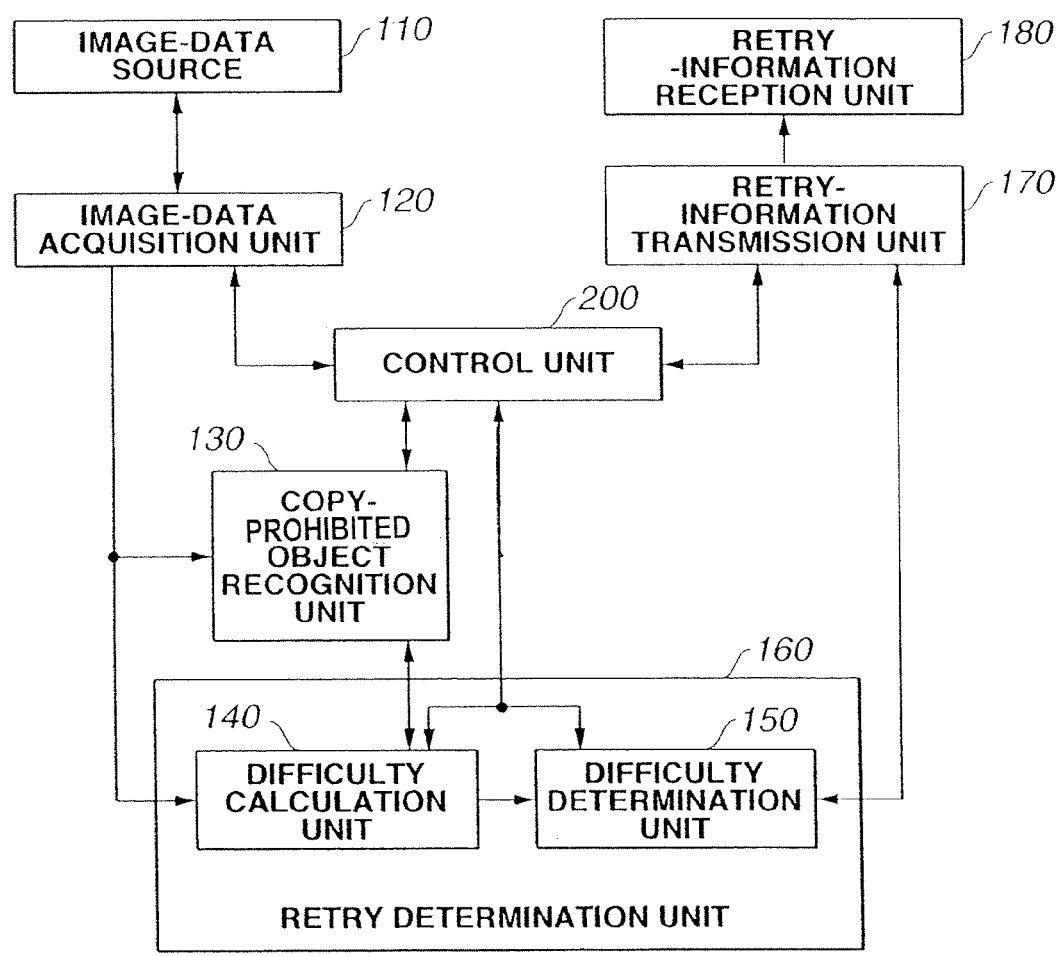
FIG. 1 is a block diagram illustrating the configuration of an image processing apparatus according to the present invention.

An image processing apparatus proposed in the following embodiments of the present invention includes, as shown in FIG. 1, an image-data acquisition unit 120 for inputting image data from an image-data source 110, such as a color scanner or the like, a copy-prohibited-object recognition unit 130 for determining whether or not the image data obtained by the image-data acquisition unit 120 is image data obtained by reading a copy-prohibited object, a retry determination unit 160 including a difficulty calculation unit 140 for calculating the difficulty in determining whether or not the image data represents a copy-prohibited object, and a difficulty determination unit 150 for determining the difficulty from data obtained from the difficulty calculation unit 140, a retry-information transmission unit 170 for transmitting retry information, and the like. A retry-information reception unit 180, such as a display device or the like, receives the retry information, and displays, for example, a request (or recommendation) to again read an original by a scanner or the like to an operator or the like of an image processing system. A control unit 200 controls the operations of the entire image processing system.

In the above-described configuration, each functional block operates in the following manner. By the operator operation on an instruction unit (not shown) of the image processing system, image data obtained by performing photoelectric scanning of an original set on the image-data source 110 is input to the copy-prohibited-object recognition unit 130 and the difficulty calculation unit 140 via the image-data acquisition unit 120. The difficulty calculation unit 140 calculates the difficulty in determining whether or not the input image data (may also be attribute data relating to the data, or the like) represents a copy-prohibited object. The calculated data of difficulty is output to the difficulty determination unit 150. The difficulty determination unit 150 determines the difficulty from data obtained from the difficulty calculation unit 140, and outputs the result of the determination to the control unit 200. When the result of the determination indicates that it is difficult to determine whether or not the image data represents a copy-prohibited object and it is preferable to again read the original by a device for reading (generating) image data, such as a scanner or the like, the control unit 200 outputs a signal to request (or recommend) to again read the original by the image-data reading (generating) device to the retry-information reception unit 180 via the retry-information transmission unit 170, in order to obtain an input image for which it is easier to determine a copy-prohibited object.

In the following first embodiment of the present invention, a description will be provided of a case in which information indicating a copy-prohibited object included within an original is formed according to a technique called "digital watermark" That is, it is assumed that an original, serving as a copy-prohibited object, is formed from image data (electronic image information) including copy-prohibited-object information generated by embedding second digital information indicating a copy-prohibited object in image data (electronic information), serving as first digital information to be formed as a printed matter.

The digital watermark may have any appropriate form, such as an invisible digital watermark in which information is embedded in spatial frequencies of image data, a visible digital watermark in which information is embedded according to an arrangement of yellow (or yellow-type) dots which are difficult to be seen by human eyes, or the like.

As described above, in order to extract digital-watermark data embedded according to the digital-watermark technique, it is necessary to obtain consistency between reading and extracting conditions with conditions when generating a printed matter in which digital-watermark information is embedded (i.e., for example, at what position of image data and at what arrangement the information is embedded).

In general, both of a printing apparatus for generating a printed matter from electronic image data, and a scanning direction when reading the printed matter (original) by an original-reading device, such as a color scanner or the like, are fixed. Accordingly, when reading a printed matter (an original) in which digital-watermark information is embedded by an original-reading device, such as a color scanner or the like, difficulty in extraction of digital-watermark information from image data greatly depends on in which direction the original is mounted on the surface of an original-mount when being read.

The first embodiment will now be described in detail with reference to the drawings.

Figure 2:
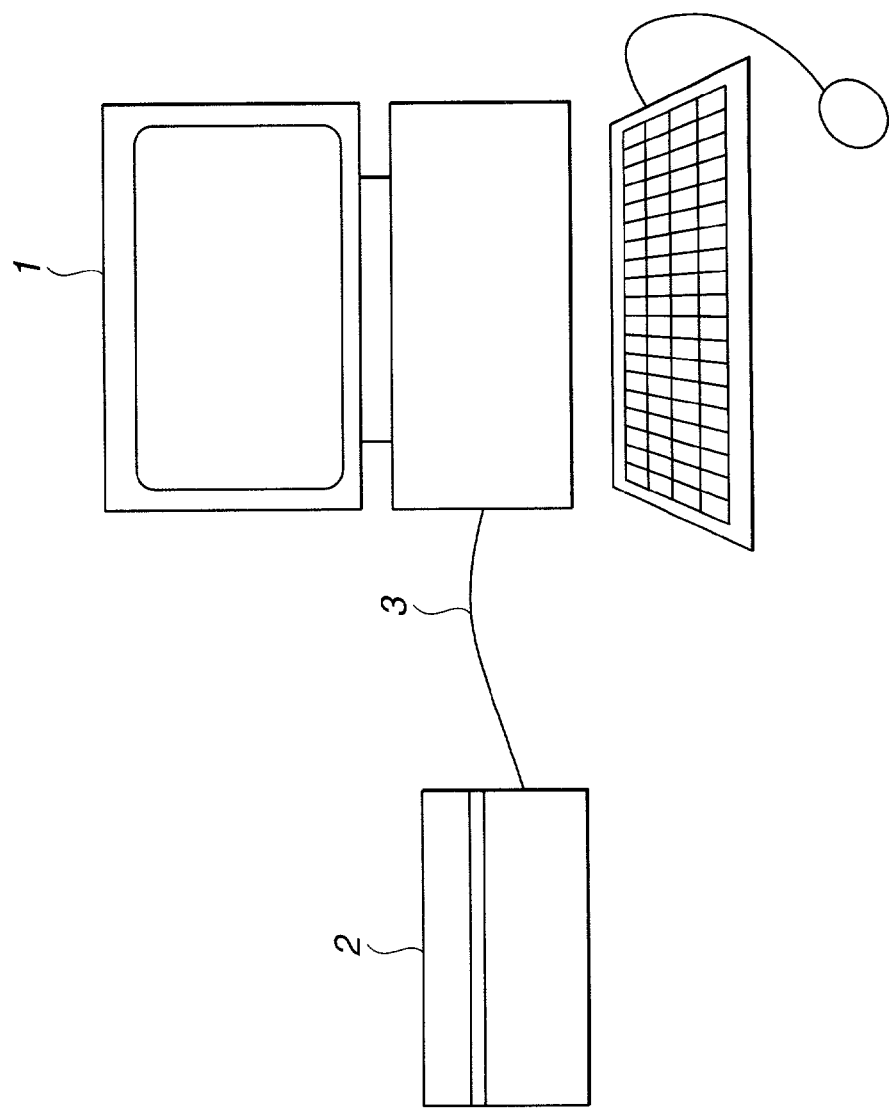
FIG. 2 is a diagram illustrating an image processing system according to a first embodiment of the present invention.

FIG. 2 illustrates an image processing system according to the first embodiment. In FIG. 2, there are shown a personal computer 1, serving as a computer system, a color image scanner 2, serving as an image input device, and a connection cable 3 for exchanging data between the computer system 1 and the color image scanner 2.

Figure 3:
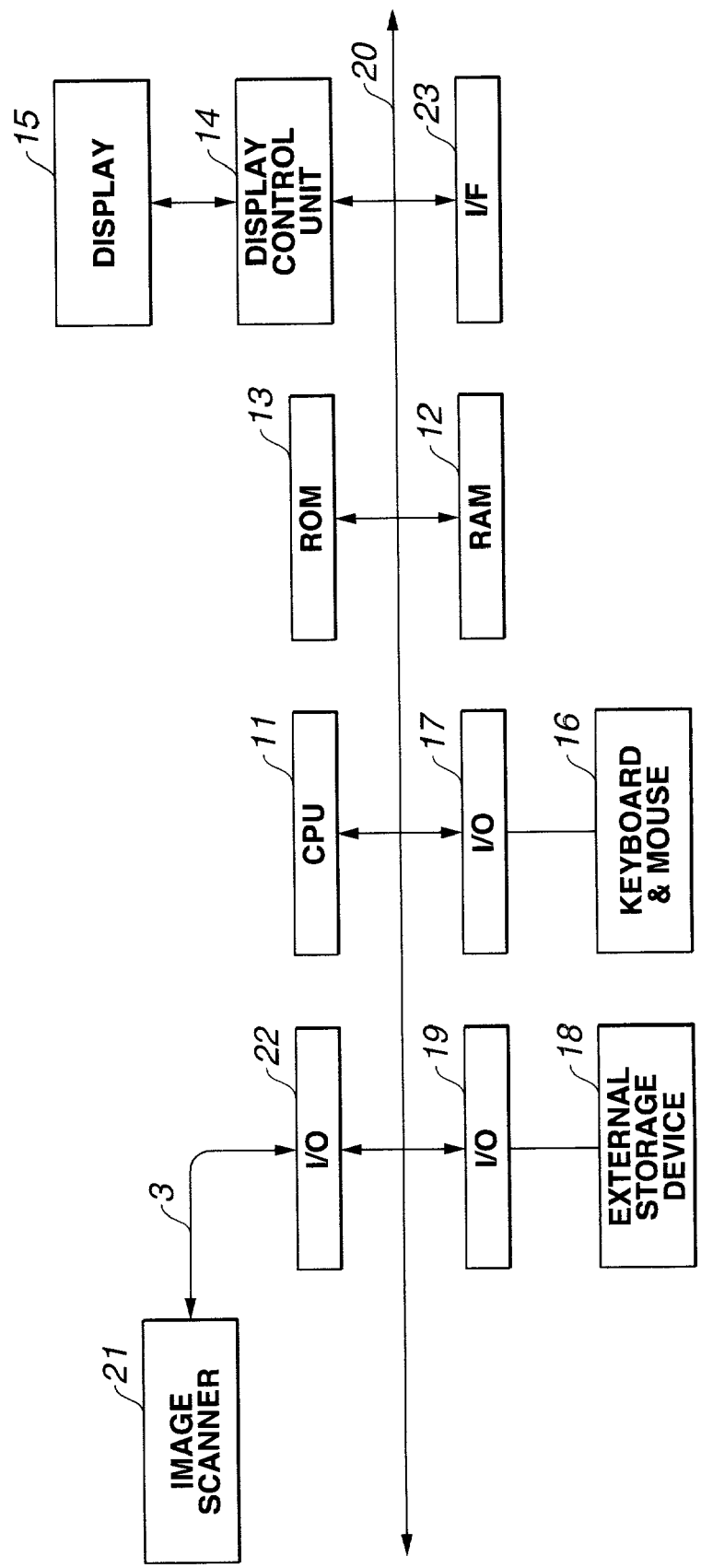
FIG. 3 is a block diagram illustrating the configuration of a principal portion of the system shown in FIG. 2.

FIG. 3 is a block diagram illustrating a principal portion in the configuration shown in FIG. 2 as functional modules. In FIG. 3, there are shown a CPU (central processing unit) 11, a RAM (random access memory) 12, a ROM 13, a display control unit 14, a display 15, an operation input device 16 including a keyboard, a mouse and the like, an input/output control device (hereinafter abbreviated as an /O 17 for connection to the operation input unit 16, an external storage device 18, such as a hard-disk device or the like, an I/O 19 for connection to the external storage device 18, a bus 20, a color image scanner 21, an I/O 22 for connection to an image input device, such as a color image scanner or the like, through the connection cable 3, and an interface unit 23 operating as an interface with communication means, such as a network or the like.

Figure 4:
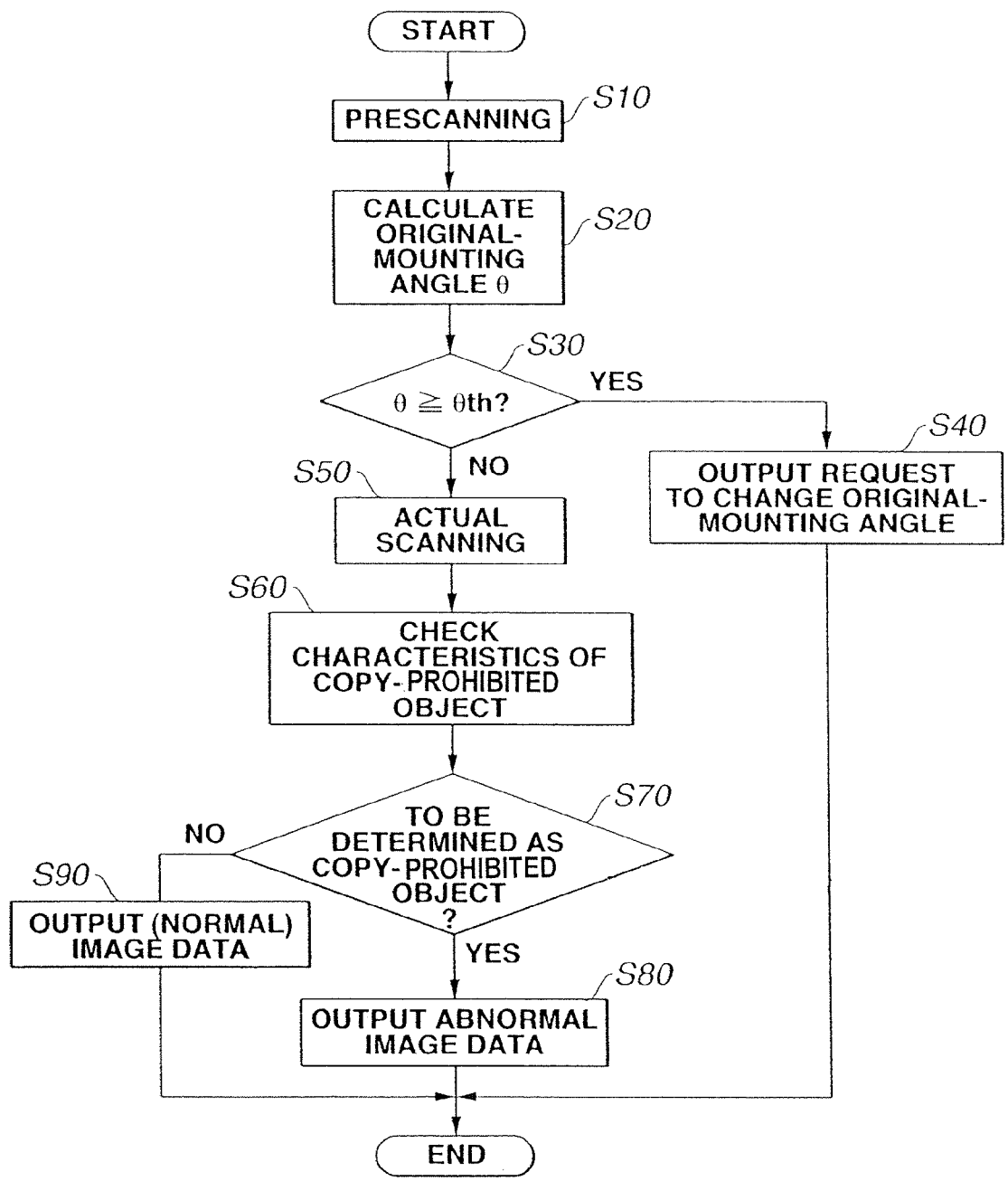
FIG. 4 is a flowchart illustrating operation procedures in the configuration shown in FIGS. 2 and 3.

FIG. 4 is a flowchart illustrating operation procedures for executing the first embodiment in the configuration shown in FIGS. 2 and 3. By storing a program, executable by a computer, which describes procedures shown in the flowchart of FIG. 4 in the ROM 13 in advance, or reading a program stored in advance in the external storage device 19 into the RAM 12, and then executing the program by the CPU 11, the processing of the flowchart shown in FIG. 4 is performed.

In the flowchart shown in FIG. 4, upon start of a series of processing, first, in step S10, the CPU 11 instructs the color image scanner 21 via the I/O 22 to read an original mounted on a reading surface with a reading density (for example, 100 dpi (dots per inch)) lower than a finally desired reading density (for example, 400 dpi). The color image scanner 22 reads the original with the instructed low density. The obtained image data with the low density is stored in the RAM 12 via the I/O 22. Although a detailed description will be omitted, this reading with the low density is performed using a known function provided by a color-image-scanner driver.

Then, in step S20, a mounting angle θ of the original on the platen of the scanner is calculated from the image data read with the low density and stored in the RAM 12 obtained in step S10, and the process proceeds to step S30.

In step S30, it is determined whether or not the read image has an angle (at least a predetermined angle $\theta_{th}$) at which detection of a copy-prohibited image is difficult in recognition/determination processing with a relatively small amount of calculation operations. If the result of the determination in step S30 is affirmative, the process proceeds to step S40. If the result of the determination is negative, the process proceeds to step S50.

In step S50, the CPU 11 instructs the color image scanner 21 to read the original mounted on the reading surface with the finally desired reading density (for example, 400 dpi), via the I/O 22. The color image scanner 21 reads the original with the instructed reading density. The obtained image data is stored into the RAM 12 via the I/O 22. Upon completion of step S50, the process proceeds to step S60.

In step S60, the presence of characteristics of a copy-prohibited object in the image data obtained in step S50 is checked. The process then proceeds to step S70.

In step S70, it is determined whether or not the image is a copy-prohibited image based on the result of the check in step S60. If the result of the determination in step S70 is affirmative, the process proceeds to step S80. If the result of the determination in step S70 is negative, the process proceeds to step S90.

In step S80, abnormal image data is output. That is, as described above, an abnormal image (other than the read image data) represented by (1) image data entirely painted with a certain color, (2) image data obtained by superposing a certain symbol or figure on the image, (3) image data in which the color or the image size is changed, or a combination of these image data is output. Such an abnormal image can be easily generated by executing a program module for performing known appropriate image processing in which the read image stored in the RAM 12 is input, by the CPU 11. The generated abnormal image data is output as an image data file to the external storage device 18 via the I/O 19. Upon completion of step S80, the series of processing is terminated.

In step S90, the image data read in step S50 is output to the external storage device 18 via the I/O 19 as an image data file. Upon completion of step S80, the series of processing is terminated.

In step S40, the CPU 11 outputs a signal indicating that the mounting angle θ of the original on the reading surface of the scanner is an angle (at least $\theta_{th}$) at which detection of a copy-prohibited image is difficult, and requesting to again read the original by changing the mounting state, to the display device 15 via the display control unit 14. Upon completion of step S40, the series of processing is terminated. In accordance with the result of the output, the display device 15 displays the mounting angle of the original in the form of an image.

In the above-described step S80, the operation that (4) image data is not output at all may, of course, be performed instead of outputting a certain image data file. The operation that (5) a signal indicating a warning that the original is a copy-prohibited object is output to the display device 15 via the display control unit 14 may, of course, also be performed.

In the processing of calculating the mounting angle of the original on the original-reading surface performed in step S20, the angle of the original is detected by detecting the positions of edges of the original for each scanning line by detecting the difference between the pixel density value when reading the platen cover of the scanner and the pixel density value when reading the background portion of the original, and detecting the positions of the four corners of the original based on information relating to changes in the positions of the edges of the original.

The check of the characteristics of a copy-prohibited object in step S60 is performed by extracting the characteristics from image data obtained by performing photoelectric scanning of the original, serving as a printed matter including information relating to a copy-prohibited object using the above-described digital-watermark technique, by the scanner.

In step S70, it is determined whether or not information relating to a copy-prohibited object has been extracted in step S60. If the result of the determination in step S70 is negative, the process proceeds to step S90. If the result of the determination in step S70 is affirmative, the process proceeds to step S80.

The determination of the mounting angle in step S30 is realized by comparing the threshold of the angle at which extraction of digital-watermark information performed in step S60 becomes difficult with the angle $\theta_{th}$ predetermined by an experiment or the like.

According to the above-described configuration, the problem that, when recognition/determination processing with a relatively small amount of calculation operations is adopted, an erroneous recognition determination may be obtained depending on the mounting angle of the original can be solved by again reading the original with an angle at which precise determination can be performed by the user's operation.

Second Embodiment

Although in the above-described first embodiment, the check of the characteristics of a copy-prohibited object in step S60 is performed by extracting the characteristics from image data obtained by performing photoelectric scanning of the original, serving as a printed matter including copy-prohibited-object information using the digital-watermark technique, any other appropriate approach may also be adopted. The check of the characteristics of a copy-prohibited object in step S60 may be performed by comparing a color-spectrum distribution of image data obtained by scanning the original with data registered in advance in the ROM 13, based on each pixel value (a set of R, G and B values corresponding to three-color signals) in the image data, or comparing the synthetic image pattern of a part or the entirety of the original with pattern data registered in advance in a ROM or the like. In this case, in step S70, the evaluation value (the sum of the absolute values of difference values, the cross-correlation value between distributions, or the like) is determined based on a predetermined threshold (for example, if the sum of the absolute values of difference values does not exceed the threshold, the image is determined to be a copy-prohibited object, and if the sum exceeds the threshold, the image is determined not to be a copy-prohibited object, or if the cross-correlation value exceeds the threshold, the image is determined to be a copy-prohibited object, and if the cross-correlation value does not exceed the threshold, the image is determined not to be a copy-prohibited object).

Third Embodiment

In the above-described first and second embodiments, the calculation of the mounting angle θ of the original (calculation of the difficulty in extraction of copy-prohibited-object information) is performed in steps S20 and S30, and a determination of whether or not extraction of copy-prohibited-object information is difficult (determination of difficulty) is performed from the obtained angle. However, any other appropriate approach may be adopted. The process of obtaining the mounting angle of the original in step S20 may be replaced by processing of obtaining the positions of the four corners of the original in the digital image obtained by reading the original on the original-mount (platen) and calculating the mounting position of the original (the coordinates of the four corners of the original) as shown in step S21 of FIG. 5, and the process of step S30 in FIG. 4 may be replaced by a determination of whether or not the mounting position of the original coincides with a predetermined standard position as shown in step S31 of FIG. 5. If the result of the determination in step S31 is affirmative, the process eventually proceeds to step S70 assuming that the determination of a copy-prohibited object is not difficult. If the result of the determination in step S31 is negative, the process proceeds to step S41. The process of outputting a signal requesting to change the mounting angle of the original in step S40 of FIG. 4 is replaced by the process of outputting a signal requesting to change the mounting position of the original as shown in step S41 of FIG. 5. Other portions are entirely the same as in the first or second embodiment.

Figure 6:
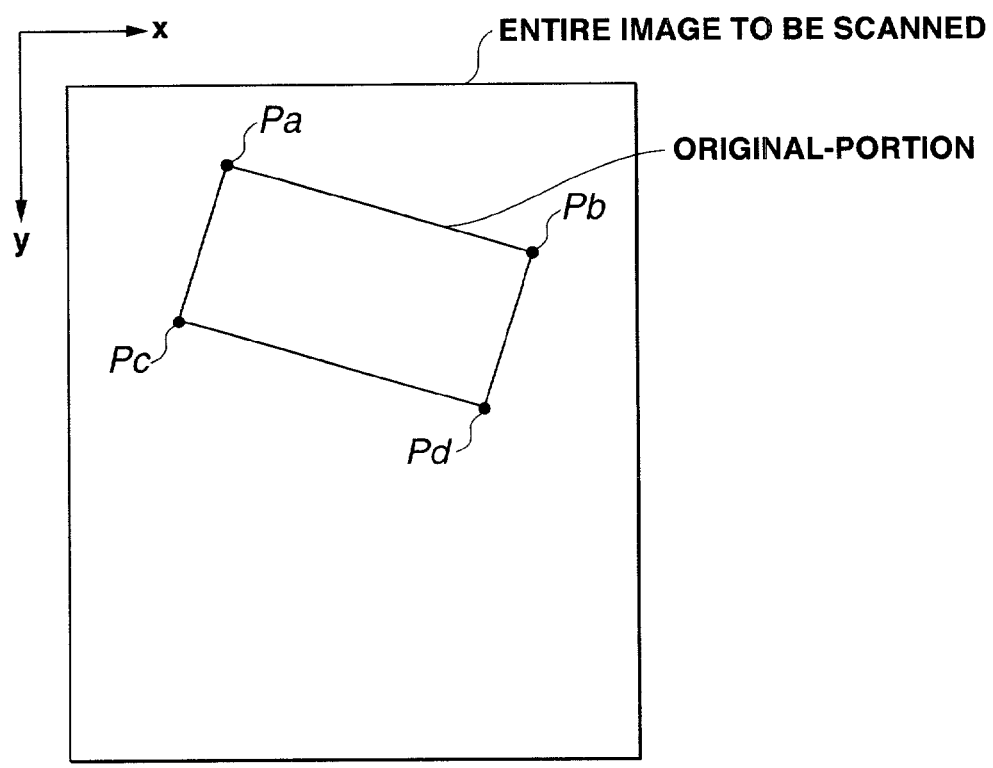
FIG. 6 is a diagram illustrating a state of four corners of an original in the third embodiment.

In step S31, as shown in FIG. 6, when the coordinate values of four corners Pa, Pb, Pc and Pd of the original obtained in step S21 are represented by (xa, ya), (xb, yb), (xc, yc) and (xd, yd), respectively, it is determined whether or not conditions of either one of (xa<x0 and ya<y0) and (xb<x0 and yb<y0), and |ya−yb|<yth and |xa−xc|<xth are satisfied. Each of x0, y0, xth and yth is a predetermined sufficiently small nonnegative integer.

According to such a configuration, it is possible to detect not only whether or not the mounting angle is to be changed, but also whether or not the mounting position is to be changed, and therefore to urge the operator to provide an original-mounting state in which the determination is easier. As a result, it is possible to realize scanning of an image by precisely determining an original in a shorter time.

Fourth Embodiment

Although in the above-described first through third embodiments, the calculation of difficulty in determination whether or not an image is a copy-prohibited object shown in step S20 or S21 is performed from an image obtained by pre-scanning shown in step S10, the present invention is not limited to such an approach. That is, actual scanning performed in step S50 may be performed in step S10. The image read in this actual scanning may be stored in the RAM 12 or the external storage device 18, and the stored image may be processed at the processing starting from step S60.

In this case, although it is necessary to provide storage means having a capacity sufficient enough to store the entire scanned image within the apparatus, it is possible to shorten the time required for pre-scanning.

Fifth Embodiment

Although in the above-described first through fourth embodiments, the characteristics of a copy-prohibited object are checked for the image read by the scanner, the present invention is not limited to such an approach.

That is, the object to be checked is not limited to a color image read by a color scanner. For example, color-image data may be obtained via the interface unit 23 for a communication medium, such as a network or the like, shown in FIG. 3, or may be obtained from a removable storage medium (such as a smart medium, a compact flash memory, a magnetooptical disk or the like) storing the image data, by mounting it in a driving device (not shown) connected to the image processing system.

In this case, the acquisition of image data in steps S10 and S50 may be replaced by reading of image data stored in the removable storage medium mounted in the driving device into the RAM 12 via an I/O for the driving device of the storage medium.

The acquisition of image data in steps S10 and S50 may, of course, also be replaced by acquisition of image data via an interface unit for communication means, such as an Internet network. In this case, retry information described as a signal requesting to change the mounting angle or the position of the original in step S40 or S41, respectively, may be replaced, for example, by a signal recommending to reform an image to be input to a display device, such as the display 15 or the like of the image processing system, and acquire the formed image.

Sixth Embodiment

Although in the above-described first through fifth embodiments, image data is output to the external storage device 18 (a hard disk or the like within the image processing system) via the I/O 19 as an image data file, whether the image data is output as normal image data or abnormal image data, the present invention is not limited to such an approach.

That is, the image data may be output to a color printer connected to the image processing apparatus, or to the outside of the image processing apparatus via an interface unit for a communication medium, such as a network or the like.

Figure 7:
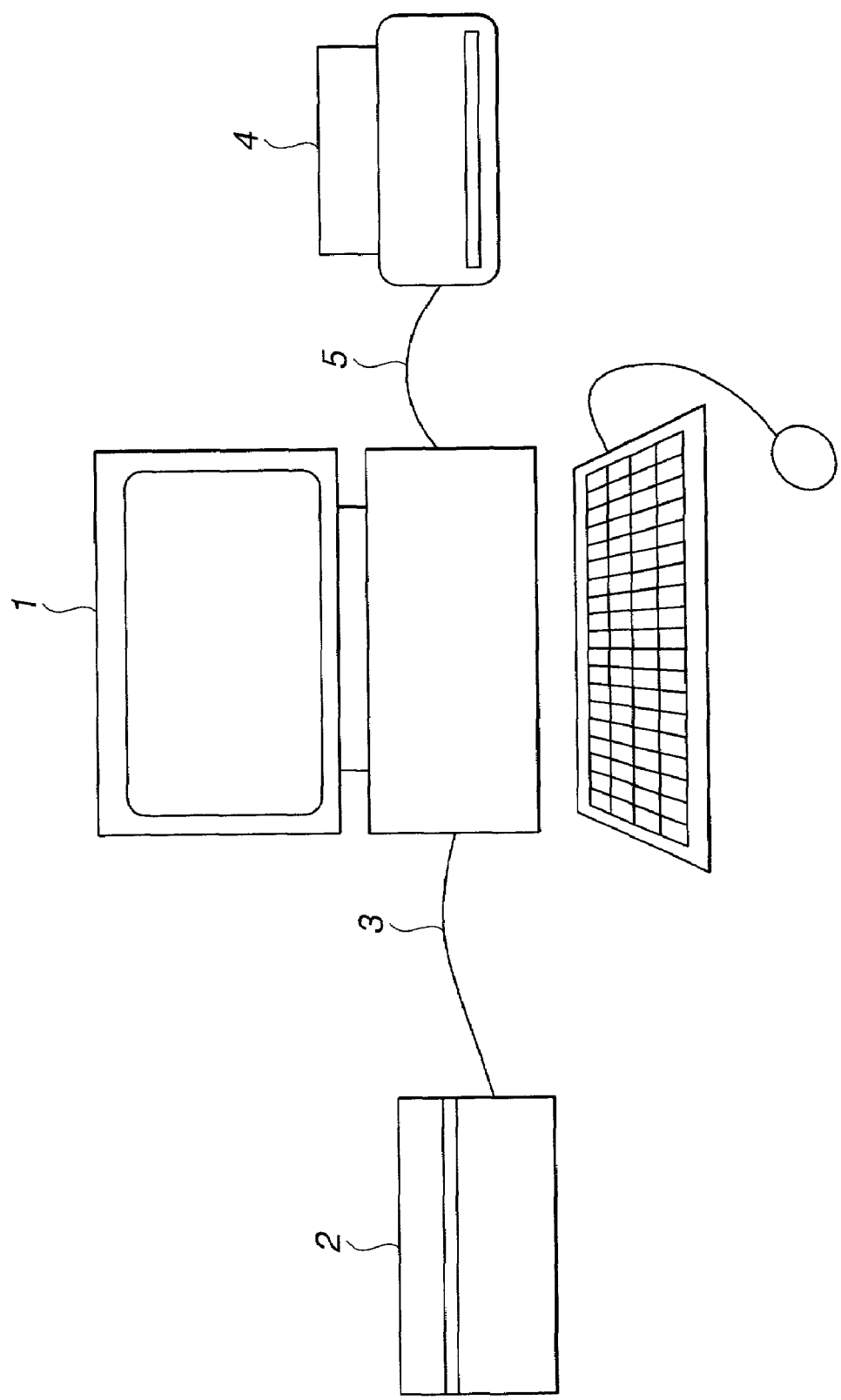
FIG. 7 is a diagram illustrating an image processing system according to a sixth embodiment of the present invention.

FIG. 7 illustrates an image processing system in such a case. In FIG. 7, as in the case of FIG. 2, a personal computer 1 serves as a computer system. A color printer 4 serves as an image output apparatus. A connection cable 5 is used for exchanging data between the computer system 1 and the color printer 4.

Figure 8:
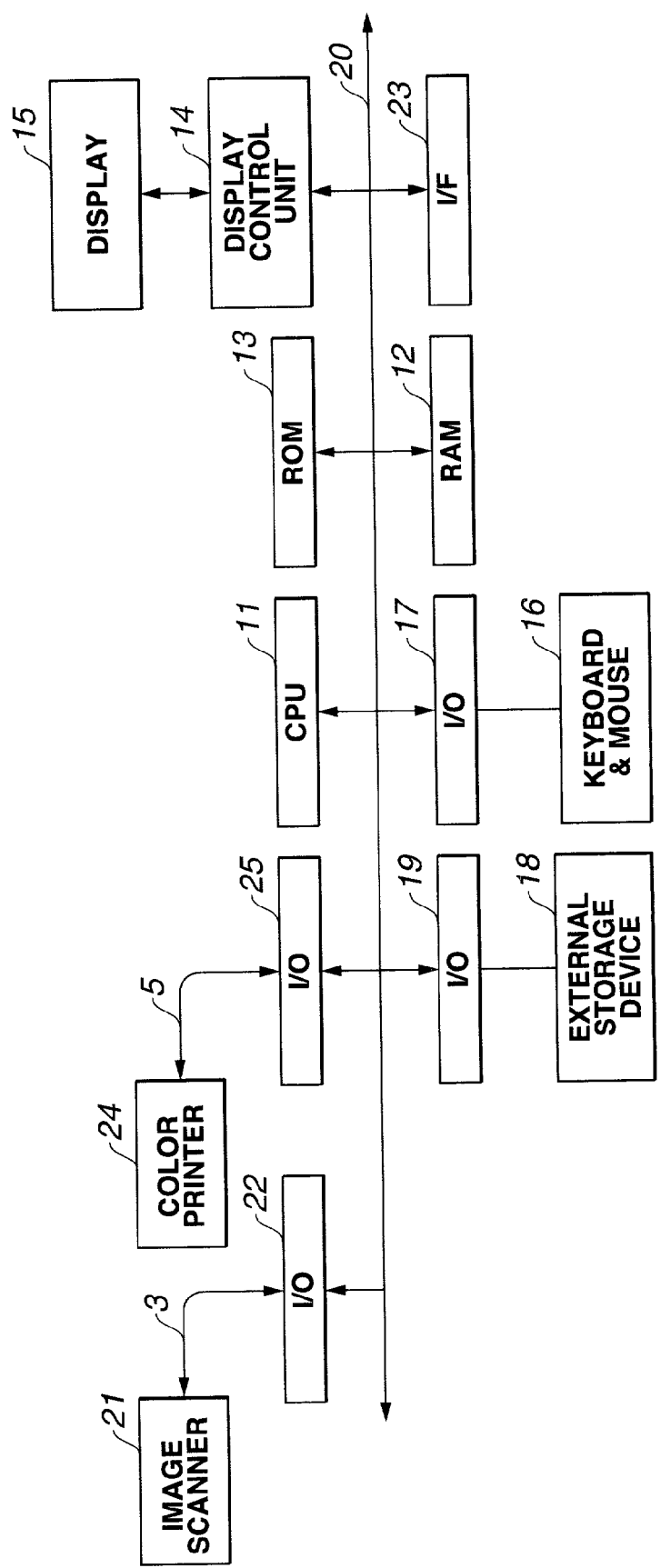
FIG. 8 is a block diagram illustrating the configuration of a principal portion of the system shown in FIG. 7.

FIG. 8 is a block diagram illustrating a principal portion in the configuration of FIG. 7 as functional modules. In FIG. 8, reference numeral 25 represents a connection I/O for an image output apparatus, such as a color printer or the like. Reference numeral 24 represents a color printer. Other components are entirely the same as in the case of FIG. 3.

Figure 5:
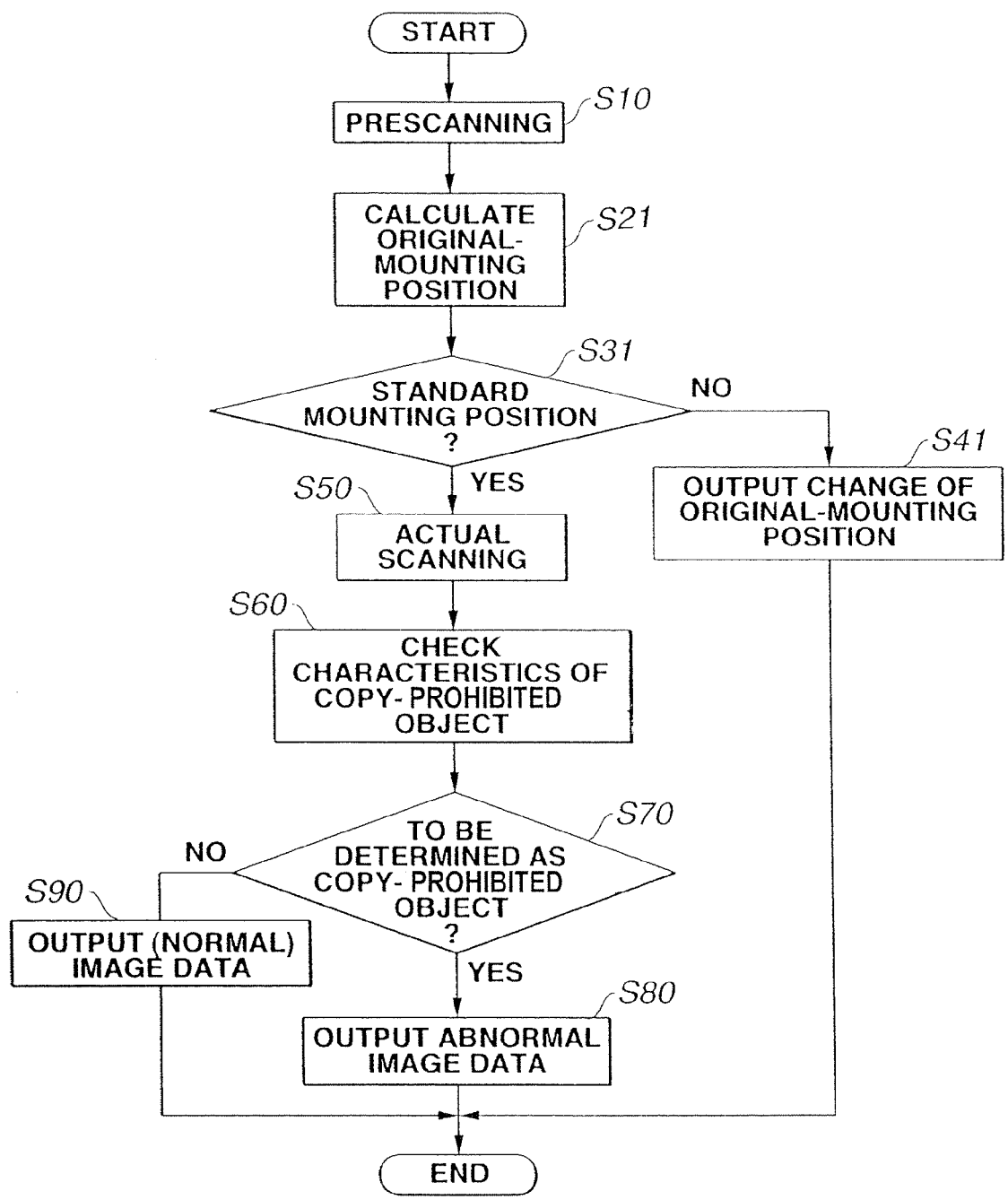
FIG. 5 is a flowchart illustrating operation procedures in a third embodiment of the present invention.

In this case, output of image data in step S80 or S90 in the flowchart of FIG. 4 or 5 is realized by output of image data to the color printer 24 connected to the image processing system via the I/O 25, through connection cable 5.

Output of image data in step S80 or S90 may, of course, be realized by output of image data to the outside of the system via an interface unit for communication means, such as an Internet network or the like.

Seventh Embodiment

Although in the above-described first through sixth embodiments, the presence of characteristics indicating whether or not input image data represents a copy-prohibited object is determined, the present invention is not limited to such an approach.

That is, The present invention may also be applied to a case in which sub-information relating to image data itself included within the image data is detected, instead of a case of determining whether or not the image data represents a copy-prohibited object. For example, the present invention may also be applied to a case in which the presence of copyright information (sub-information) is confirmed from a hard-copy image for an image in which copyright information, serving as second digital information (sub-information), is mixed in original image data, serving as first digital information (main information), using the digital-watermark technique in order to claim the copyright of the user who has formed the image. By calculating the difficulty in extraction of the characteristics of the image as described above, and determining whether or not retry of input of the image is to be urged, based on the result of the calculation, it is, of course, possible to construct an image processing system which can easily extract the characteristics of the image.

Figure 9:
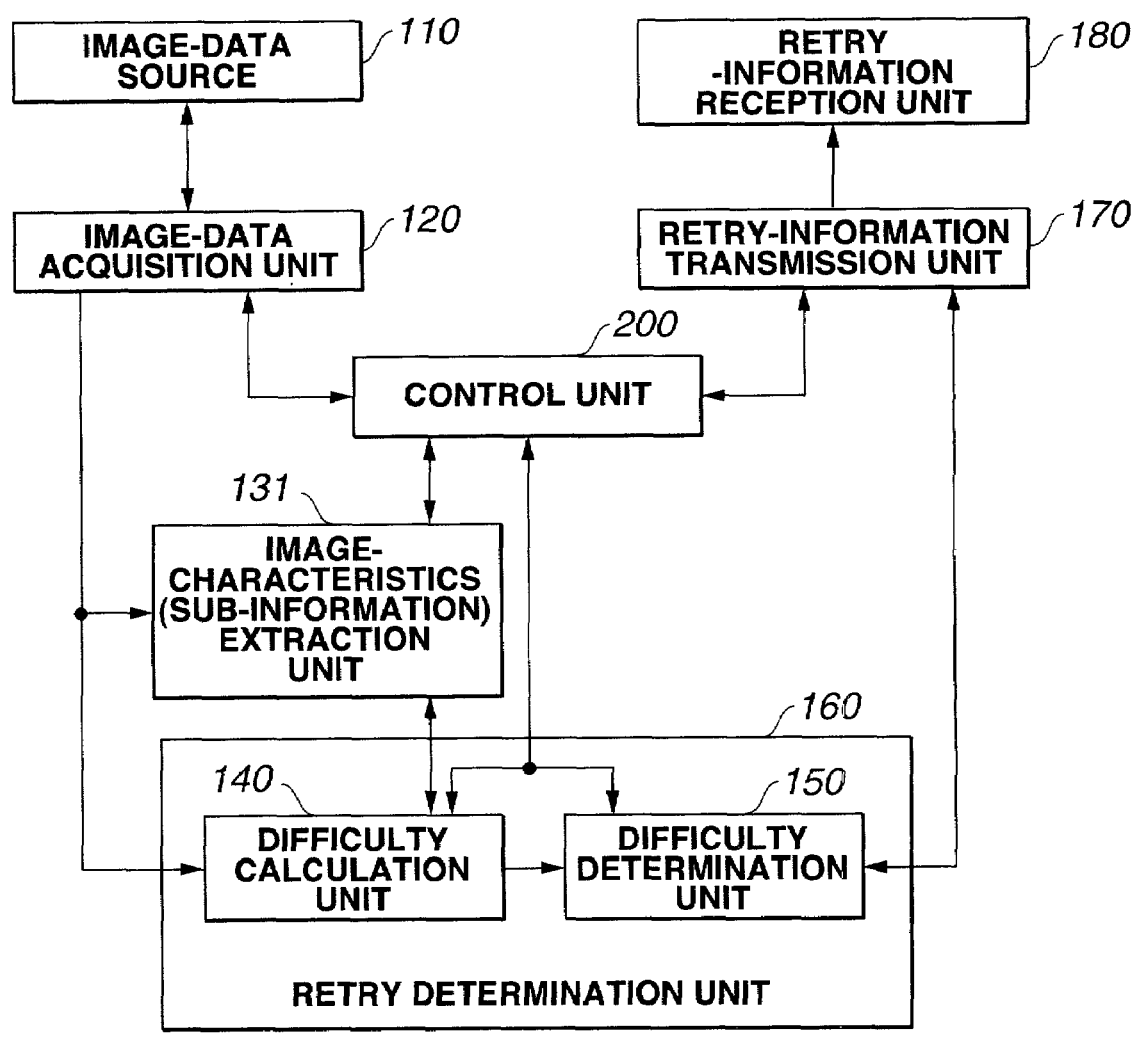
FIG. 9 is a diagram illustrating the configuration of an image processing apparatus according to a seventh embodiment of the present invention.
Figure 10:
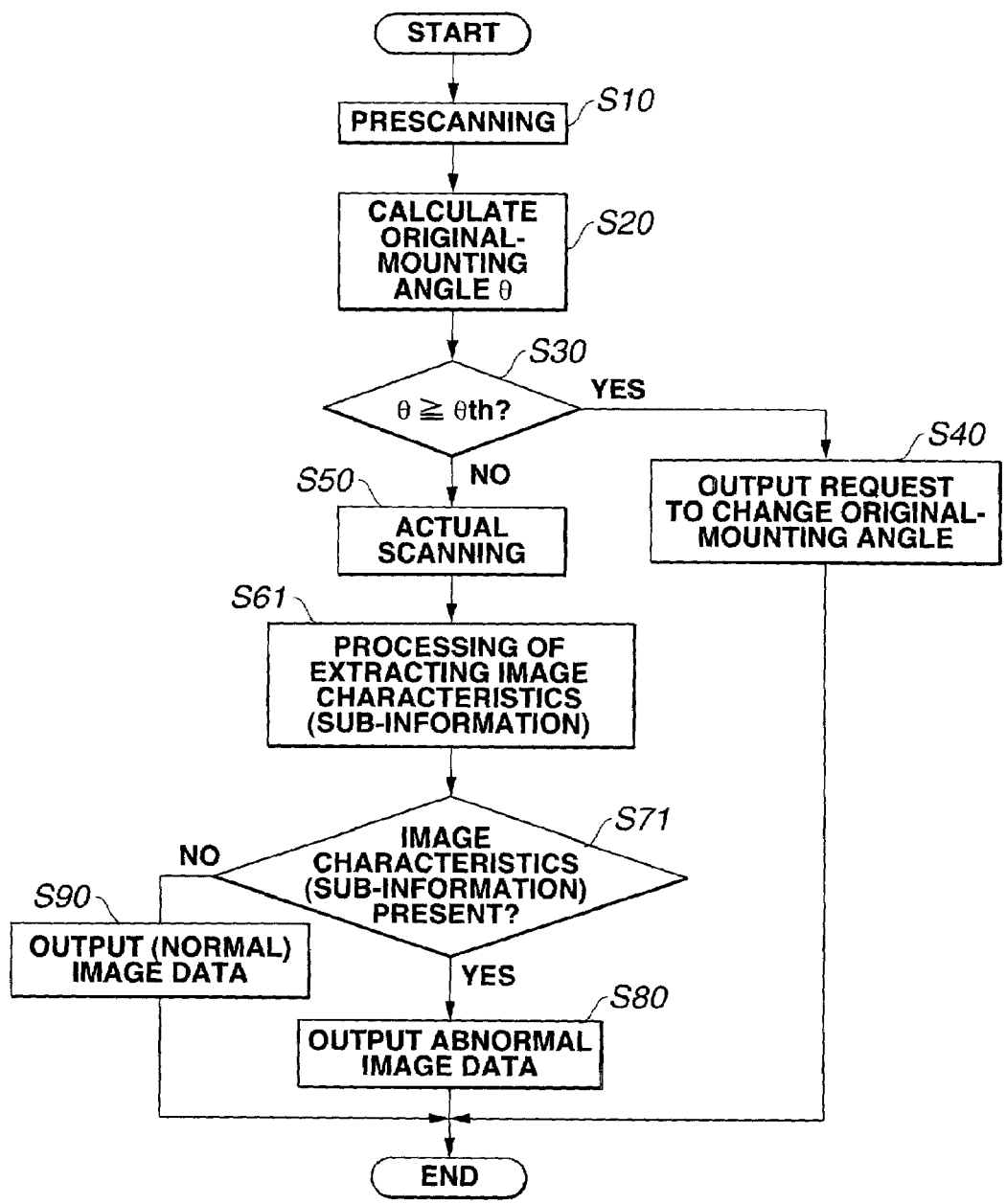
FIG. 10 is a flowchart illustrating operation procedures in the configuration shown in FIGS. 2 and 3 according to the seventh embodiment.
Figure 11:
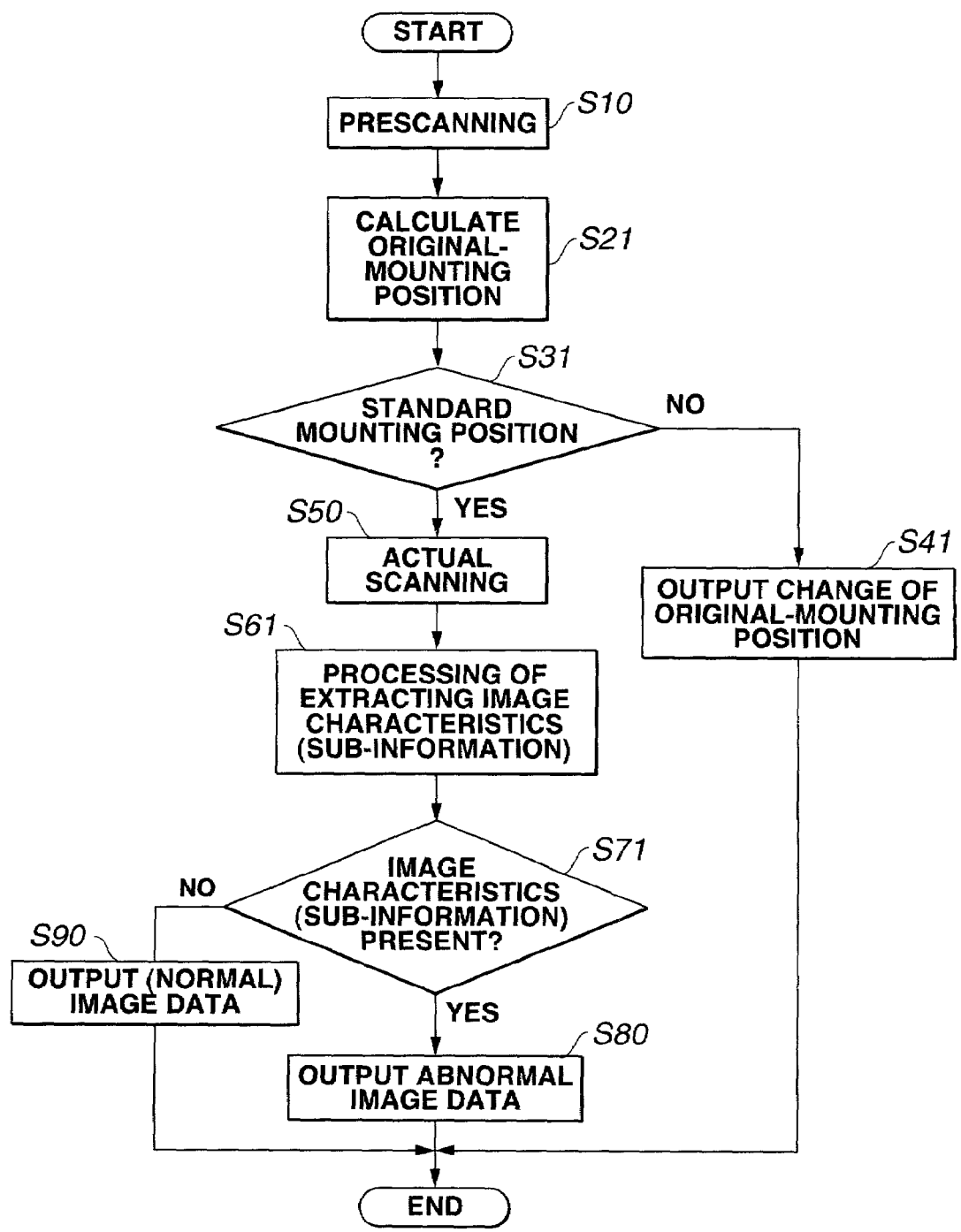
FIG. 11 is a flowchart illustrating another operation procedure in the seventh embodiment.

In this case, the copy-prohibited-object recognition unit 130 shown in FIG. 1 may be replaced by an image-characteristics extraction unit 131 shown in FIG. 9. Since other components shown in FIG. 9 operate in entirely the same manner as in the case of FIG. 1, further detailed description thereof will be omitted. In accordance with this modification, as shown in FIG. 10, the processing in step S60 in FIG. 4 or 5 is replaced by processing of extracting image characteristics (sub-information) in step S61 of FIG. 10, and the processing in step S70 in FIG. 4 or 5 is replaced by determination processing in step S71 of FIG. 10, and the same processing as in FIG. 4 or 5 is performed after the determination in step S71.

In the seventh embodiment, step S80 is not necessarily processing of outputting an abnormal image. For example, extracted copyright information, serving as sub-information, may be displayed on a display or the like via the display control unit 14. Similarly, step S90 may be processing of displaying the fact of absence of copyright information, serving as sub-information, on a display or the like via the display control unit 14, instead of outputting of normal image data.

A processing method of storing a program for operating the configuration of each of the above-described embodiments in a storage medium so as to realize the functions of the above-described embodiments, reading the program stored in the storage medium as codes, and executing the codes by means of a computer is also included within the scope of the embodiments, and the storage medium storing the program is also included in the embodiments.

A floppy disk, a hard disk, an optical disk, a magnetooptical disk, a CD(compact disc)-ROM, a magnetic tape, a nonvolatile memory card, or a semiconductor ROM may be used as the storage medium.

In addition to execution of processing by a program stored in the above-described storage medium, execution of the operations of the above-described embodiments by operating in an OS (operating system) in cooperation with the functions of other software and expansion board is also included within the scope of the embodiments.

The individual components shown in outline or designated by blocks in the drawings are all well known in the image processing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus, comprising:
   image-data input means for inputting image data;
   specific-image determination means for determining whether the image data input by said image-data input means represents a specific image having predetermined characteristics;
   re-input determination means for determining whether to output a signal urging re-input of the image data input by said image-data input means, said re-input determination means including difficulty determination means for determining whether the determination by said specific-image determination means is difficult, said difficulty determination means comprising difficulty calculation means for calculating a mounting position of a document, wherein said difficulty determination means determines whether the determination by said specific-image determination means is difficult by comparing information about the mounting position to a predetermined threshold, and wherein said re-input determination means determines whether to output the signal urging re-input of the image data based on the determination by said difficulty determination means,
   wherein said difficulty determination means determines whether the determination by said specific-image determination means is difficult using a scan of the image at a first density and, if it is determined that the determination by said specific-image determination means is not difficult, said specific-image determination means performs a determination using a scan of the image at a second density higher than the first density; and
   signal output means for outputting the signal urging re-input of the image data, in accordance with a result of the determination by said re-input determination means.

2. An image processing apparatus according to claim 1, wherein said specific-image determination means determines whether the image data represents a copy-prohibited image.

3. An image processing apparatus according to claim 1, wherein said difficulty determination means determines whether it is difficult for said specific-image determination means to determine whether the image is a copy-prohibited image based on the difficulty calculated by said difficulty calculation means.

4. An image processing apparatus according to claim 1, wherein said re-input determination means determines whether re-input of the image data is to be urged from data based on a position of an original in an image represented by the input image data.

5. An image processing apparatus according to claim 1, wherein said difficulty calculation means calculates the difficulty in the determination of the specific image from data based on a position of an original in an image represented by the input image data, and wherein said difficulty determination means determines whether the determination by said specific-image determination means is difficult by comparing data of the difficulty calculated by said difficulty calculation means with a predetermined value.

6. An image processing apparatus according to claim 3, wherein said difficulty calculation means calculates the difficulty in the determination of a copy-prohibited image from data based on a position of an original in an image represented by the input image data, and wherein said difficulty determination means determines whether the determination of a copy-prohibited image is difficult by comparing data of the difficulty calculated by said difficulty calculation means with a predetermined value.

7. An image processing apparatus according to claim 5, wherein data of the difficulty calculated by said difficulty calculation means comprises an angle of the original with respect to a scanning direction of the image represented by the input image data.

8. An image processing apparatus according to claim 5, wherein data of the difficulty calculated by said difficulty calculation means comprises a deviation of the original from a predetermined position with respect to a scanning direction of the image represented by the input image data.

9. A method for controlling an image processing apparatus, said method comprising:
   an inputting step of inputting image data;
   a specific-image determining step of determining whether the image data input in said image-data input step represents a specific image having predetermined characteristics;
   a re-input determining step of determining whether to output a signal urging re-input of the image data input in said image-data input step, said re-input determining step including a difficulty determining step of determining whether the specific-image determining step is difficult, said difficulty determining step comprising a difficulty calculation step of calculating a mounting position of a document, wherein said difficulty determining step determines whether the determination by said specific-image determining step is difficult by comparing information about the mounting position to a predetermined threshold, and wherein said re-input determining step determines whether to output the signal urging re-input of the image data based on the determination in said difficulty determining step,
   wherein said difficulty determining step determines whether the determination in said specific-image determining step is difficult after reading the image at a first density and, if it is determined that the determination in said specific-image determining step is not difficult, the specific-image determining step is performed after reading the image at a second density higher than the first density; and
   an outputting step of outputting the signal urging re-input of the image data, in accordance with a result of the determination in said re-input determining step.

10. A method according to claim 9, wherein in said specific-image determining step, it is determined whether the image data input in said image-data input step represents a copy-prohibited image.

11. A method according to claim 9, wherein said difficulty determining step determines whether it is difficult to determine in the specific-image determining step whether the image data represents a copy-prohibited image.

12. A method according to claim 9, wherein in said re-input determining step, it is determined whether the re-input is to be urged from data based on a position of an original in an image represented by the input image data.

13. A method according to claim 9, wherein in said difficulty calculation step, the difficulty in the determination of the specific image is calculated from data based on a position of an original in an image represented by the input image data, and wherein in said difficulty determination step, it is determined whether the determination of the specific image is difficult by comparing data of the difficulty calculated in said difficulty calculation step with a predetermined value.

14. A method according to claim 11, wherein in said difficulty calculation step, the difficulty in the determination of a copy-prohibited image is calculated from data based on a position of an original in an image represented by the input image data, and wherein in said difficulty determination step, it is determined whether the determination of a copy-prohibited image is difficult by comparing data of the difficulty calculated in said difficulty calculation step with a predetermined value.

15. A method according to claim 13, wherein data of the difficulty calculated in said difficulty calculation step comprises an angle of the original with respect to a scanning direction of the image represented by the input image data.

16. A method according to claim 13, wherein data of the difficulty calculated in said difficulty calculation step comprises a deviation of the original from a predetermined position with respect to a scanning direction of the image represented by the input image data.

17. A computer-readable storage medium, capable of being read by a computer, storing a program to cause an image processing apparatus to execute the steps comprising:

an inputting step of inputting image data;

a specific-image determining step of determining whether the image data input in said image-data input step represents a specific image having predetermined characteristics;

a re-input determining step of determining whether to output a signal urging re-input of the image data input in said image-data input step, said re-input determining step including a difficulty determining step of determining whether the specific-image determining step is difficult, said difficulty determining step comprising a difficulty calculation step of calculating a mounting position of a document, wherein said difficulty determining step determines whether the determination by said specific-image determining step is difficult by comparing information about the mounting position to a predetermined threshold, and wherein said re-input determining step determines whether to output the signal urging re-input of the image data based on the determination in said difficulty determining step, wherein said difficulty determining step determines whether the determination in said specific-image determining step is difficult after reading the image at a first density and, if it is determined that the determination in said specific-image determining step is not difficult, the specific-image determining step is performed after reading the image at a second density higher than the first density; and an outputting step of outputting the signal urging re-input of the image data, in accordance with a result of the determination in said re-input determining step.

* * * * *

UNITED STATES PATENT AND TRADEMARK OFFICE
CERTIFICATE OF CORRECTION

PATENT NO. : 7,259,878 B2
APPLICATION NO. : 09/769363
DATED : August 21, 2007
INVENTOR(S) : Yoshihiro Ishida et al.

It is certified that error appears in the above-identified patent and that said Letters Patent is hereby corrected as shown below:

Col. 1, line 62, "watermark that" should read --watermark". That--.

Col. 5, line 8, "watermark"" should read --watermark".--.

line 53, "/O" should read --I/O)--.

Signed and Sealed this

Twenty-ninth Day of April, 2008

JON W. DUDAS
*Director of the United States Patent and Trademark Office*